US012695477B2

(12) United States Patent
Wei et al.

(10) Patent No.: US 12,695,477 B2
(45) Date of Patent: Jul. 28, 2026

(54) DOWNLINK FREQUENCY HOPPING COMMUNICATION FOR REDUCED CAPABILITY USER EQUIPMENT

(71) Applicant: QUALCOMM Incorporated, San Diego, CA (US)

(72) Inventors: Chao Wei, Beijing (CN); Wanshi Chen, San Diego, CA (US); Peter Pui Lok Ang, San Diego, CA (US); Huilin Xu, Temecula, CA (US); Jing Lei, San Diego, CA (US); Jing Dai, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 538 days.

(21) Appl. No.: 17/794,289

(22) PCT Filed: Jan. 22, 2020

(86) PCT No.: PCT/CN2020/073824
§ 371 (c)(1),
(2) Date: Jul. 21, 2022

(87) PCT Pub. No.: WO2021/147002
PCT Pub. Date: Jul. 29, 2021

(65) Prior Publication Data
US 2023/0084494 A1      Mar. 16, 2023

(51) Int. Cl.
*H04W 72/00* (2023.01)
*H04B 1/713* (2011.01)
*H04W 72/23* (2023.01)

(52) U.S. Cl.
CPC ............ *H04B 1/713* (2013.01); *H04W 72/23* (2023.01)

(58) Field of Classification Search
None
See application file for complete search history.

(56) References Cited

U.S. PATENT DOCUMENTS

| | | | |
|---|---|---|---|
| 9,860,678 B2 * | 1/2018 | Oh ........................ | H04L 5/0048 |
| 10,306,441 B2 | 5/2019 | Alvarino et al. | |
| 10,462,629 B2 | 10/2019 | Bhattad et al. | |
| 11,589,351 B2 * | 2/2023 | Vummintala ......... | H04L 5/0039 |
| 11,994,339 B2 * | 5/2024 | Park .................... | G05B 13/027 |

(Continued)

FOREIGN PATENT DOCUMENTS

| | | |
|---|---|---|
| CN | 105827371 A | 8/2016 |
| CN | 107925468 A | 4/2018 |

(Continued)

OTHER PUBLICATIONS

International Search Report and Written Opinion—PCT/CN2020/073824—ISA/EPO—Oct. 30, 2020.

(Continued)

*Primary Examiner* — Gerald A Smarth
(74) *Attorney, Agent, or Firm* — Loza & Loza LLP

(57) ABSTRACT
A reduced-capability user equipment (UE) uses frequency hopping to improve downlink (DL) coverage. Specifically, the UE may receive a physical downlink shared channel (PDSCH) using frequency hopping among a plurality of narrow hands in a wide bandwidth part. A bandwidth of narrow band is not larger than a maximum wireless communication bandwidth of the UE.

30 Claims, 14 Drawing Sheets

(56) References Cited

U.S. PATENT DOCUMENTS

| | | | | |
|---|---|---|---|---|
| 2017/0134881 A1 | 5/2017 | Oh | | |
| 2019/0069256 A1* | 2/2019 | Jung | .................. | H04W 72/0453 |
| 2019/0182899 A1 | 6/2019 | Ye et al. | | |
| 2019/0230664 A1 | 7/2019 | Vummintala et al. | | |
| 2019/0253100 A1 | 8/2019 | Liu et al. | | |
| 2019/0341962 A1* | 11/2019 | Yi | .......................... | H04B 1/713 |
| 2021/0195620 A1* | 6/2021 | Yoshimura | ........ | H04W 72/1273 |

FOREIGN PATENT DOCUMENTS

| | | | | | |
|---|---|---|---|---|---|
| CN | 113728705 B | * | 5/2024 | ........... | H04L 1/1822 |
| WO | WO-2017026549 A1 | * | 2/2017 | ............. | H04B 1/713 |
| WO | 2018009690 A1 | | 1/2018 | | |
| WO | 2018144768 | | 8/2018 | | |
| WO | WO-2018143033 A1 | * | 8/2018 | .............. | H04W 4/70 |
| WO | WO-2020220253 A1 | * | 11/2020 | ........... | H04W 72/23 |
| WO | 2021146887 A1 | | 7/2021 | | |

OTHER PUBLICATIONS

Qualcomm Incorporated: "Coexistence of LTE-MTC With NR", 3GPP TSG-RAN WGI #94, RI-1809025, Aug. 20-24, 2018 Gothenburg, Sweden, Aug. 24, 2024 18 (Aug. 24, 2024 18), Section 2, pp. 1-4.
Qualcomm Incorporated: "Maintenance for Flexible Starting PRB", 3GPP Tsg-Ran WG1 #94bis, R1-1810906, 3rd Generation Partnership Project, Mobile Competence Centre, 650, Route Des Lucioles, F-06921 Sophia-Antipolis Cedex, France, vol. RAN WG1, No. Chengdu, China, Oct. 8, 2018-Oct. 12, 2018, Sep. 29, 2018, 12 Pages, XP051518311, The whole document.
Supplementary European Search Report—EP20915528—Search Authority—The Hague—Sep. 22, 2023.

* cited by examiner

1000

1002 — Transmit frequency hopping (FH) control information for a physical downlink shared channel (PDSCH)

1004 — Transmit the PDSCH using frequency hopping among a plurality of narrowbands (NBs), based on the FH control information, wherein a bandwidth of each of the plurality of NBs is not larger than a maximum wireless communication bandwidth of the UE

1200

1202 — Receive frequency hopping (FH) control information for a physical downlink shared channel (PDSCH)

1204 — Receive the PDSCH using frequency hopping among a plurality of narrowbands (NBs), based on the FH control information, wherein a bandwidth of each of the plurality of NBs is not larger than a maximum wireless communication bandwidth of the apparatus

DOWNLINK FREQUENCY HOPPING COMMUNICATION FOR REDUCED CAPABILITY USER EQUIPMENT

CROSS-REFERENCE TO RELATED APPLICATION(S)

This application is the U.S. national stage of PCT patent application number PCT/CN2020/073824 filed on Jan. 22, 2020.

TECHNICAL FIELD

The technology discussed below relates generally to wireless communication systems, and more particularly, to downlink communication using frequency hopping in a wireless communication system.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. A new telecommunication standard is 5G New Radio (NR). 5G NR is part of a mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. Such improvements may also be applicable to other multi-access technologies and the telecommunication standards that employ such technologies.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

One aspect of the present disclosure provides an apparatus for wireless communication. The apparatus includes a processor, a transceiver communicatively coupled to the processor, and a memory communicatively coupled to the processor. The processor is configured to receive, via the transceiver, frequency hopping (FH) control information for a physical downlink shared channel (PDSCH). The processor is further configured to receive, via the transceiver, the PDSCH using frequency hopping among a plurality of narrowbands (NBs), based on the FH control information. A bandwidth of each of the plurality of NBs is not larger than a maximum wireless communication bandwidth of the apparatus.

Another aspect of the present disclosure provides an apparatus for wireless communication. The apparatus includes a processor, a transceiver communicatively coupled to the processor, and a memory communicatively coupled to the processor. The processor is configured to transmit to a user equipment (UE), via the transceiver, frequency hopping (FH) control information for a physical downlink shared channel (PDSCH). The processor is further configured to transmit to the UE, via the transceiver, the PDSCH using frequency hopping among a plurality of narrowbands (NBs), based on the FH control information. A bandwidth of each of the plurality of NBs is not larger than a maximum wireless communication bandwidth of the UE.

Another aspect of the present disclosure provides a method for wireless communication at a user equipment (UE). The UE receives frequency hopping (FH) control information for a physical downlink shared channel (PDSCH). The UE further receives the PDSCH using frequency hopping among a plurality of narrowbands (NBs), based on the FH control information. A bandwidth of each of the plurality of NBs is not larger than a maximum wireless communication bandwidth of the UE.

Another aspect of the present disclosure provides a method for wireless communication at a scheduling entity. The scheduling entity transmits, to a user equipment (UE), frequency hopping (FH) control information for a physical downlink shared channel (PDSCH). The scheduling entity further transmits, to the UE, the PDSCH using frequency hopping among a plurality of narrowbands (NBs), based on the FH control information. A bandwidth of each of the plurality of NBs is not larger than a maximum wireless communication bandwidth of the UE.

These and other aspects of the invention will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
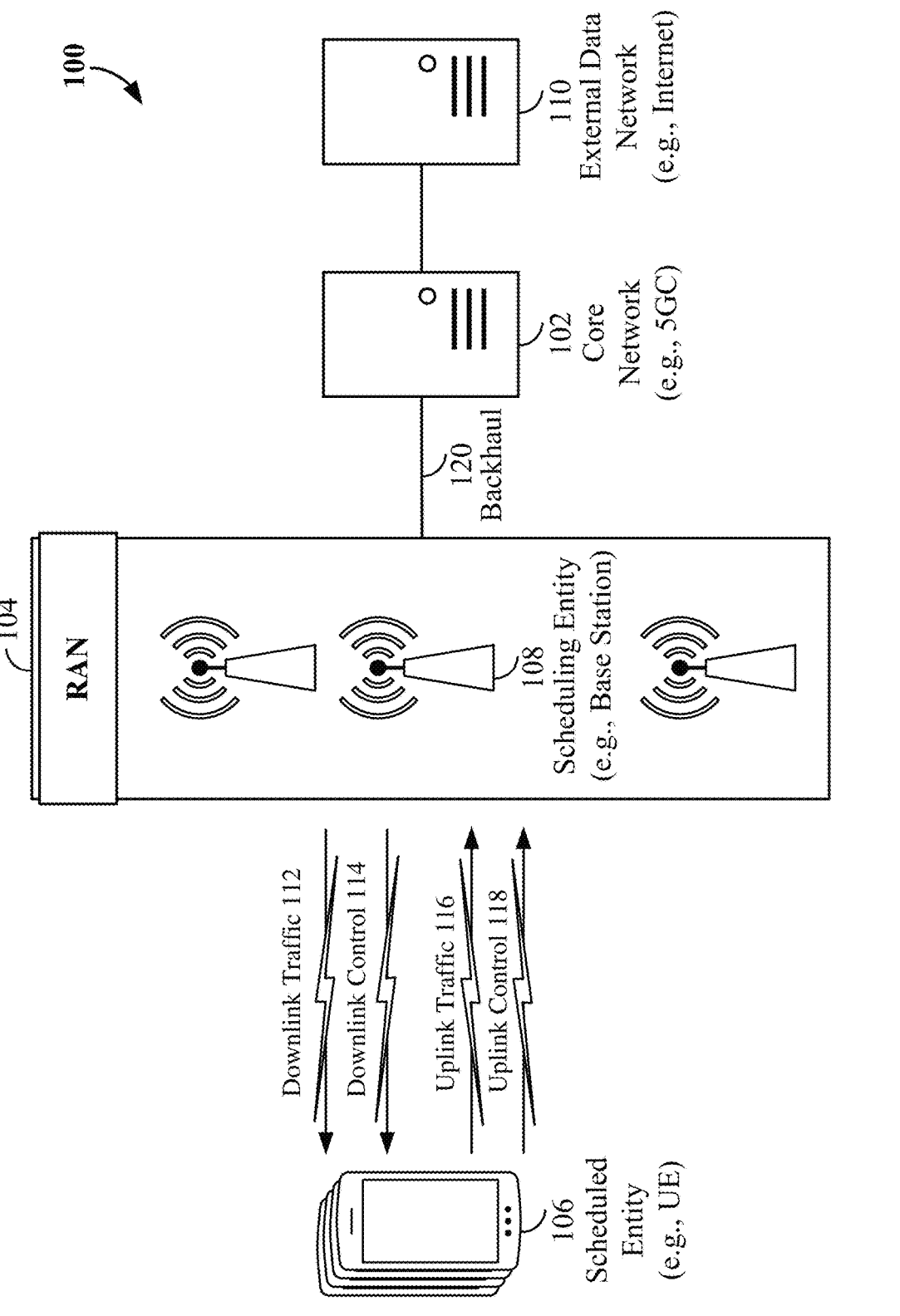
FIG. 1 is a schematic illustration of a wireless communication system according to some aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitutions.

A 5G New Radio (NR) network can provide services to various devices with different capabilities, for example, enhanced mobile broadband (eMBB), massive machine type communications (mMTC), ultra-reliable and low-latency communication (URLLC), etc. In some applications and use cases, peak capabilities are not required. Therefore, a 5G NR network should be scalable and deployable in a more efficient and cost-effective way to support devices with different capabilities. For example, a reduced capability user equipment (UE) may have limited bandwidth support and lower peak throughput, latency, and reliability requirements. Some examples of reduced capability UE are wearables, industrial wireless sensor networks, and surveillance cameras.

Aspects of the present disclosure provide various apparatuses, methods, and systems that use frequency hopping in downlink communication in a 5G NR network. In some examples, a 5G NR device may use a frequency hopping method in transmitting a physical downlink shared channel (PDSCH) to improve diversity gain and recover downlink coverage for a device with reduced capabilities than a premium device (e.g., smartphone).

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3$^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108. In some examples, the scheduled entity 106 may transmit the uplink traffic 116 using frequency hopping. In some examples, the scheduling entity may transmit the downlink traffic 112 using frequency hopping.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
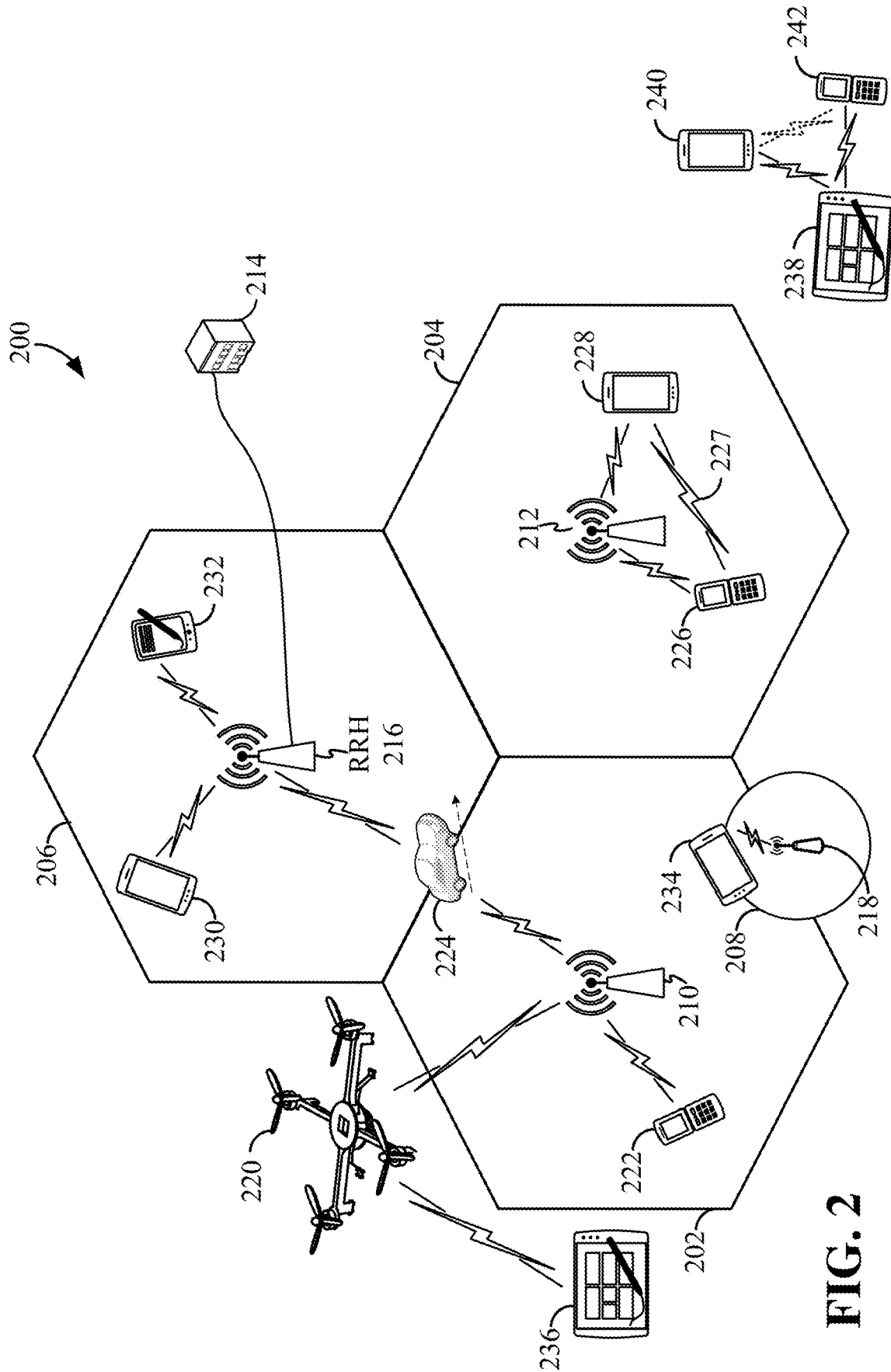
FIG. 2 is a conceptual illustration of an example of a radio access network according to some aspects of the disclosure.

FIG. 2 is a conceptual illustration of an example of a radio access network (RAN) 200 according to some aspects. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1. The UEs may use frequency hopping to communicate with the base stations or cells.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (TDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Various aspects of the present disclosure will be described with reference to an OFDM waveform, schematically illustrated in FIG. 3 It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

Within the present disclosure, a frame refers to a duration of 10 ms for wireless transmissions, with each frame consisting of 10 subframes of 1 ms each. On a given carrier, there may be one set of frames in the UL, and another set of frames in the DL. Referring now to FIG. 3, an expanded view of an exemplary DL subframe 302 is illustrated, showing an OFDM resource grid 304. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 304 may be used to schematically represent time-frequency resources for a given antenna port. That is, in a MIMO implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A UE generally utilizes only a subset of the resource grid 304. An RB may be the smallest unit of resources that can be allocated to a UE. Thus, the more RBs scheduled for a UE, and the higher the modulation scheme chosen for the air interface, the higher the data rate for the UE. The UE may use a first set of RBs for downlink communication and a second set of RBs for uplink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each subframe 302 (e.g., a 1 ms subframe) may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., 1, 2, 4, or 7 OFDM symbols). These mini-slots may in some cases be transmitted occupying resources scheduled for ongoing slot transmissions for the same or for different UEs.

An expanded view of one of the slots 310 illustrates the slot 310 including a control region 312 and a data region 314. In general, the control region 312 may carry control channels (e.g., PDCCH), and the data region 314 may carry data channels (e.g., a physical downlink shared channel (PDSCH) or a physical uplink shared channel (PUSCH)). In various examples, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Figure 3:
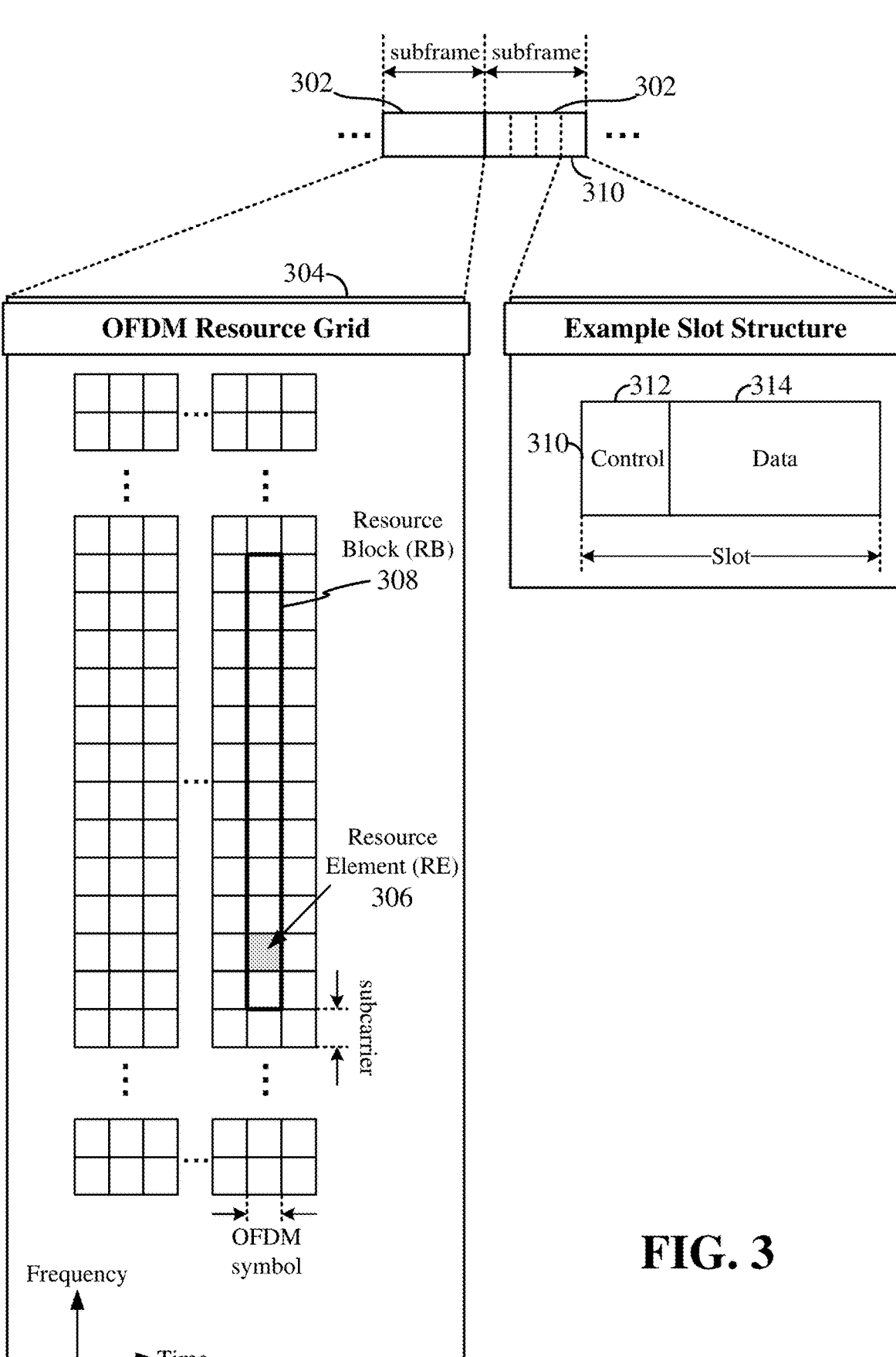
FIG. 3 is a schematic illustration of an organization of wireless resources in an air interface utilizing orthogonal frequency divisional multiplexing (OFDM) according to some aspects of the disclosure.

Although not illustrated in FIG. 3, the various REs 306 within an RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In a DL transmission, the transmitting device (e.g., the scheduling entity 108) may allocate one or more REs 306 (e.g., within a control region 312) to carry DL control information 114 including one or more DL control channels that generally carry information originating from higher layers, such as a physical broadcast channel (PBCH), a physical downlink control channel (PDCCH), etc., to one or more scheduled entities 106. In addition, DL REs may be allocated to carry DL physical signals that generally do not carry information originating from higher layers. These DL physical signals may include a primary synchronization signal (PSS); a secondary synchronization signal (SSS); demodulation reference signals (DM-RS); phase-tracking reference signals (PT-RS); channel-state information reference signals (CSI-RS); etc. The PDCCH may carry downlink control information (DCI) for one or more UEs in a cell. This can include, but is not limited to, power control commands, scheduling information, a grant, and/or an assignment of REs for DL and UL transmissions. In some examples, the PDCCH may carry frequency hopping control information of the PDSCH.

In an UL transmission, a transmitting device (e.g., a scheduled entity 106) may utilize one or more REs 306 to carry UL control information 118 (UCI). The UCI can originate from higher layers via one or more UL control channels, such as a physical uplink control channel (PUCCH), a physical random access channel (PRACH), etc., to the scheduling entity 108. Further, UL REs may carry UL physical signals that generally do not carry information originating from higher layers, such as demodulation reference signals (DM-RS), phase-tracking reference signals (PT-RS), sounding reference signals (SRS), etc. In some examples, the control information 118 may include a scheduling request (SR), i.e., a request for the scheduling entity 108 to schedule uplink transmissions. Here, in response to the SR transmitted on the control channel 118, the scheduling entity 108 may transmit downlink control information 114 that may schedule resources for uplink packet transmissions.

UL control information may also include hybrid automatic repeat request (HARQ) feedback such as an acknowledgment (ACK) or negative acknowledgment (NACK), channel state information (CSI), or any other suitable UL control information. HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In addition to control information, one or more REs 306 (e.g., within the data region 414) may be allocated for user data or traffic data. Such traffic may be carried on one or more traffic channels, such as, for a DL transmission, a physical downlink shared channel (PDSCH); or for an UL transmission, a physical uplink shared channel (PUSCH).

The channels or carriers described above and illustrated in FIGS. 1-3 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs.

In an exemplary 5G NR network, UL communication (e.g., PUSCH and PUCCH) may frequency hopping. Two exemplary frequency hopping modes are intra-slot hopping and inter-slot hopping. In intra-slot hopping, the UL communication may hop within a slot of the scheduled PUSCH/PUCCH symbols. In inter-slot hopping, the UL communication may hop every slot for PUSCH/PUCCH with slot aggregation. In a PUSCH inter-slot hopping example, based on an absolute slot index, the starting RB may be offset by a number of RBs in the odd-numbered slots where the offset is indicated in the downlink control information (DCI). DCI is a special set of control information that schedules PDSCH or PUSCH. In a PUCCH inter-slot hopping example, the scheduling entity (e.g., a base station) may use radio resource control (RRC) signaling to configure two starting PRBs, one for odd-numbered slots and the other for even-numbered slots. In some aspects of the disclosure, frequency hopping may be applied to a PDSCH as described in more detail below.

In some aspects of the disclosure, a 5G NR UE may have reduced capabilities than a premium device or full capability device (e.g., smartphone). An NR-Light UE is one example of a device with reduced capabilities. For example, an NR-Light UE may have a maximum supported bandwidth that is narrower than the full bandwidth of the scheduled band (e.g., 50 MHz for 15 kHz and 100 MHz for 30/60 kHz for band N78). An exemplary NR-Light UE may only support 10 MHz or 20 MHz of the bandwidth in a scheduled band or bandwidth part (BWP). A BWP is a subset of contiguous PRBs among the available time-frequency resources (e.g., OFDM resource grid 304 in FIG. 3). A UE may be configured with one or more BWPs in the uplink and one or more BWPs in the downlink. In general, one BWP in the UL and one BWP in the DL are active at a given time. BWP configuration parameters include numerology, frequency location, bandwidth size, and control resource set (CORESET). An NR-Light UE may have fewer receiving (Rx) antennas than a premium UE (e.g., smartphone). Therefore, the NR-Light UE may suffer from potential coverage reduction due to reduced bandwidth support and/or fewer antennas for diversity reception. In some aspects of the disclosure, the NR-Light UE may use frequency hopping to improve DL coverage. Specifically, the UE may use DL frequency hopping for the PDSCH to improve DL diversity gain.

Figure 4:
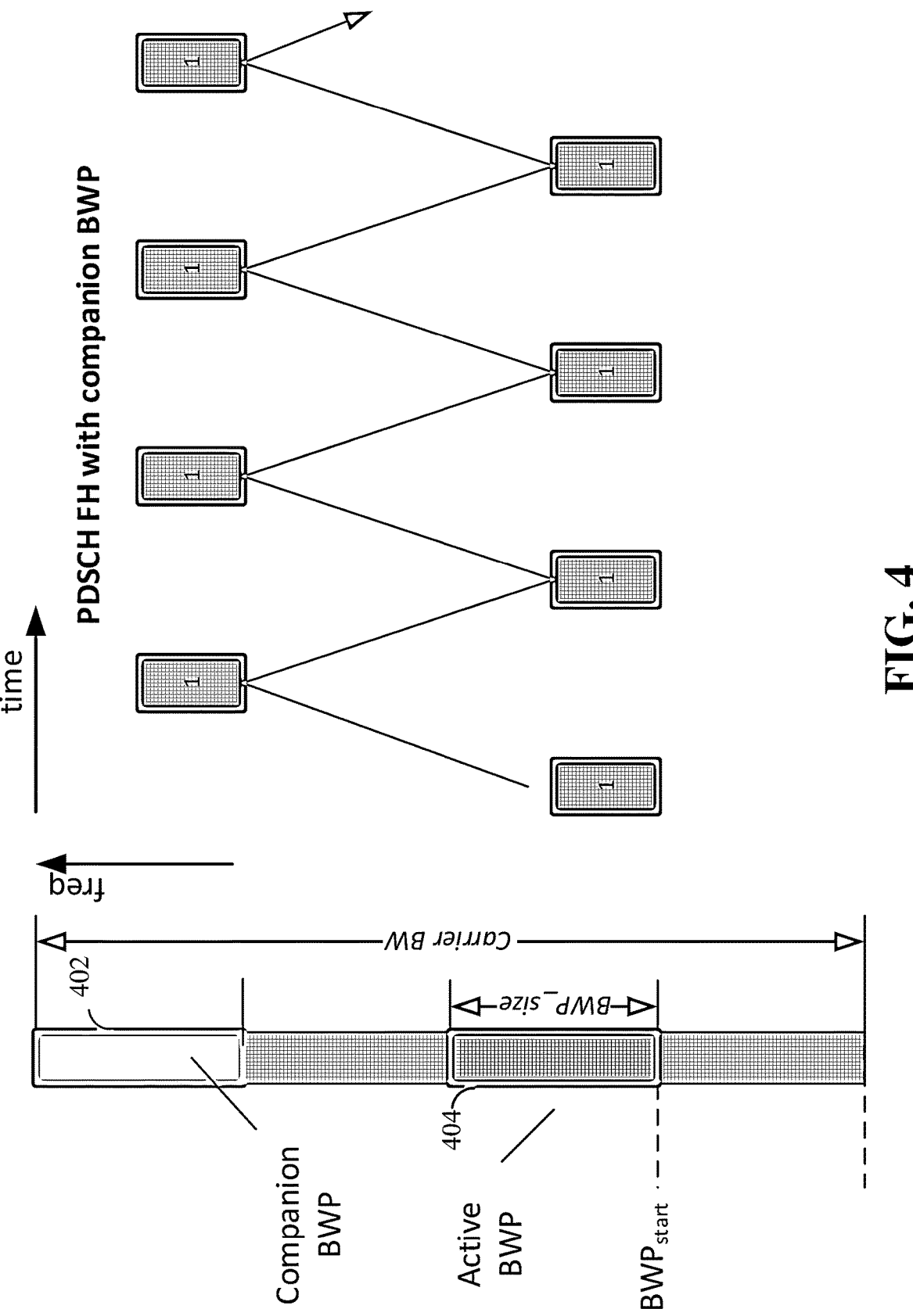
FIG. 4 is a diagram illustrating a first example of PDSCH using frequency hopping in downlink communication according to some aspects of the disclosure.

FIG. 4 is a diagram illustrating a first example of PDSCH using frequency hopping in DL communication according to some aspects of the disclosure. A scheduling entity (e.g., a gNB or base station) can configure one or more companion BWPs (e.g., companion BWP 402) in addition to an active BWP 404 for an NR-Light UE. The companion BWP and active BWP may be referred to as a narrow BWP that has a bandwidth narrower than a maximum communication bandwidth supported by an NR-Light UE or reduced capability UE. In the example shown in FIG. 4, a PDSCH (indicated by numeral 1) hops between the active BWP 404 and companion BWP 402 to improve diversity gain. In some examples, a scheduling entity may explicitly configure the BWPs, for example, using radio resource control (RRC) and/or DCI. In some examples, the UE may implicitly derive the BWP configuration based on some predetermined rules and/or with the help of some RRC configurations previously received from the scheduling entity. In one example, an information element (e.g., "locationAndBandwidth") may be optionally configured for indicating the companion BWP, which may have the same subcarrier spacing as the active BWP but at a different frequency domain location.

Figure 5:
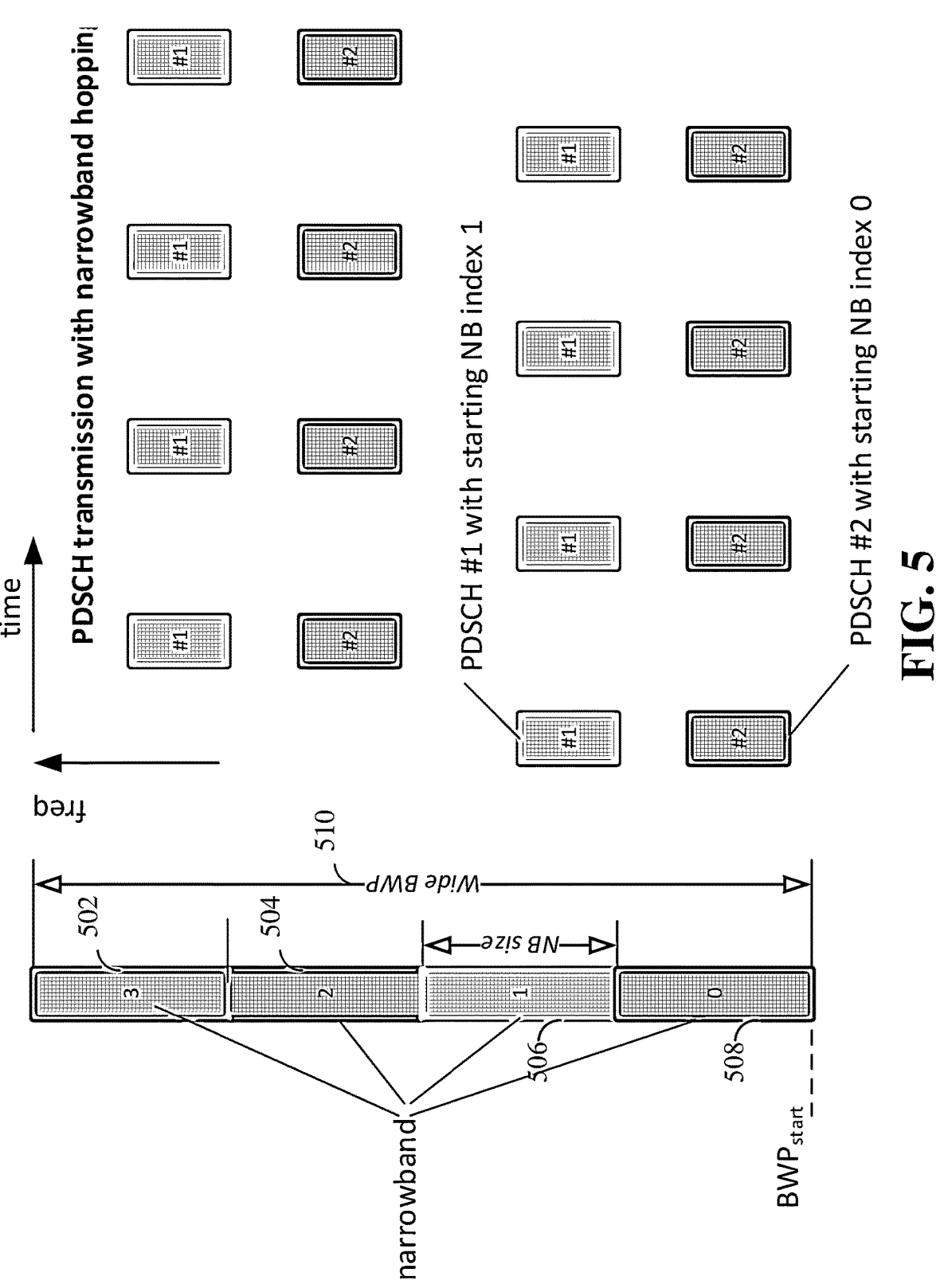
FIG. 5 is a diagram illustrating a second example of PDSCH using frequency hopping in downlink communication according to some aspects of the disclosure.

FIG. 5 is a diagram illustrating a second example of PDSCH using frequency hopping in DL communication according to some aspects of the disclosure. A scheduling entity (e.g., a gNB or base station) can configure one or more narrowbands (NBs) (e.g., NB 502, NB 504, NB 506, and NB 508 shown in FIG. 5) in an active wide BWP 510. Each NB has a bandwidth narrower than a maximum bandwidth supported by an NR-Light UE or reduced capability UE. The active wide BWP has a bandwidth larger than the maximum bandwidth supported by an NR-Light UE or the like. A PDSCH can hop between the NBs during transmission. For example, a first PDSCH (indicated by numeral #1 in FIG. 5) hops between NB 502 and NB 506. Similarly, a second PDSCH (indicated by numeral #2) hops between NB 504 and NB 508. In some examples, the scheduling entity may explicitly configure the NBs, for example, using RRC and/or DCI. In some examples, the UE may implicitly derive the narrowband configuration based on some predetermined rules and/or with the help of some RRC configurations previously received from the scheduling entity. Each NB may be defined as a set of continuous subbands or resource block groups (RBGs) with a total frequency span no larger than a maximum bandwidth supported by the UE. In 5G NR, an RB may be defined only for the frequency domain. Each RBG is a set of consecutive resource blocks (RBs) with a configurable size dependent on the total number of PRBs in the bandwidth part. Similarly, a subband is defined as contiguous PRBs with a configurable size dependent on the total number of PRBs in the bandwidth part. The configuration of NBs may be common to all the UEs sharing the same wide BWP that has a bandwidth larger than the maximum bandwidth supported by the UE. In this example, the BWP 510 includes four non-overlapping NBs (e.g., NBs 502, 504, 506, and 508), and each NB has a fixed size in number of RBGs or subbands. In one example, a subband may include 4, 8, 16, or 32 PRBs depending on the size of the BWP. The NBs may be similar in function to the companion BWP described in relation to FIG. 4. In some aspects, a network can use a wide BWP to support the coexistence of premium UE and reduced-capability UE because the wide BWP can also support the bandwidth of a premium UE that has a wider supported bandwidth than the reduced-capability UE.

Figure 6:
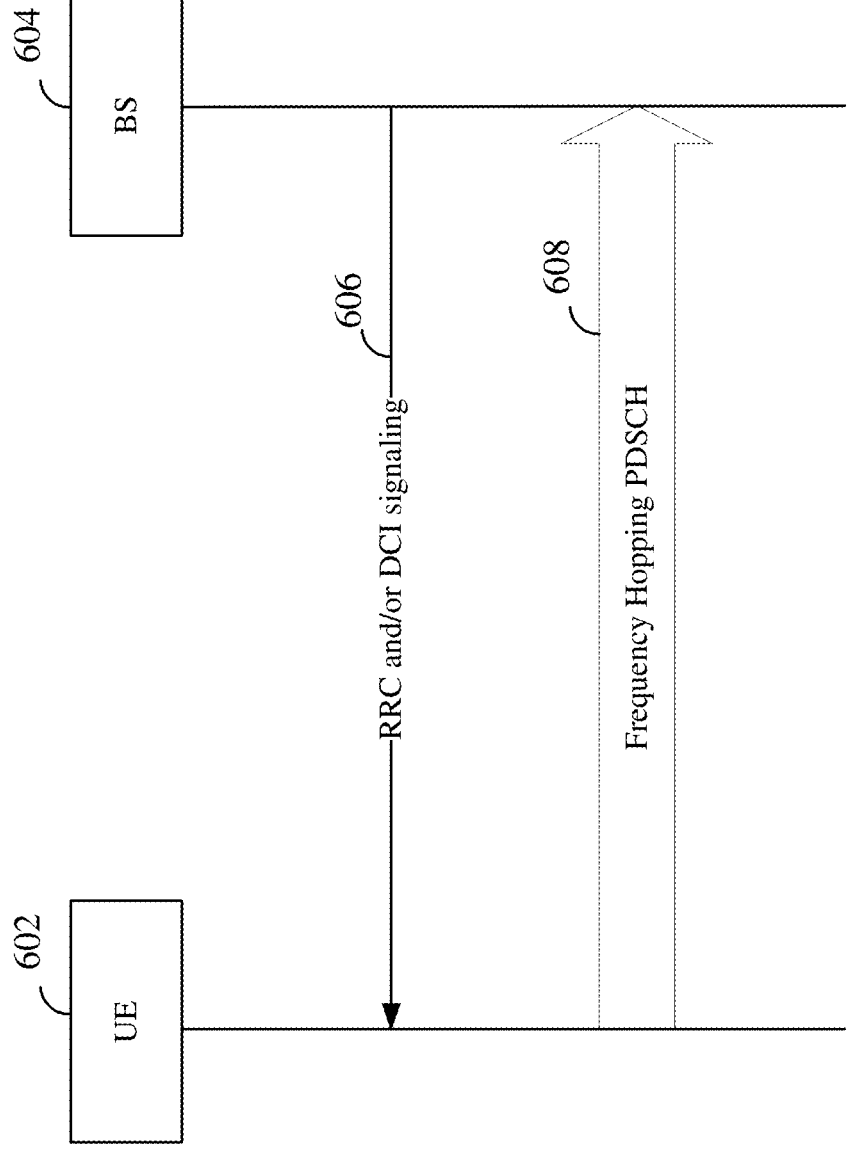
FIG. 6 is a diagram illustrating an exemplary signal flow for configuring PDSCH using frequency hopping according to some aspects of the disclosure.

FIG. 6 is a diagram illustrating an exemplary signal flow for configuring a PDSCH using frequency hopping according to some aspects of the disclosure. The wireless communication system may include a UE 602 and a base station (BS) 604 as illustrated in FIGS. 1-3. The base station 604 may use RRC and/or DCI signaling 606 to configure the UE 602 to use frequency hopping for PDSCH. The base station 604 may transmit DCI in a PDCCH. In one example, the base station 604 may configure the UE 602 to use one or more companion BWPs for PDSCH frequency hopping as described above in relation to FIG. 4. In another example, the base station 604 may configure the UE 602 to use a number of narrowbands (NBs) within a wide BWP for PDSCH frequency hopping as described above in relation to FIG. 5. For example, RRC and/or DCI signaling 606 may provide information for configuring PDSCH frequency hopping using companion BWPs or NBs. Then, the UE 602 may receive a PDSCH using frequency hopping from the base station 604 utilizing the companion/wide BWPs or NBs.

For a PDSCH frequency hopping configuration, a frequency domain resource allocation (FDRA) may consist of a starting NB index and the resource assignment within the NB. In one example, the configuration information may include an X-bit NB index, where X is determined by the number of NBs within a wide BWP. The NB index identifies a corresponding NB within the wide BWP. The configuration information may further include $$\lceil \log2(N_{RB}^{NB}(N_{RB}^{NB}+1)/2)\rceil$$

number of bits for resource allocation within the NB identified by the NB index, where $$N_{RB}^{NB}$$

is the size (e.g., bandwidth) of NB. For example, the resource allocation bits may indicate the RBs allocated for the PDSCH. In some cases, X can be zero bit if the starting NB is the same as the active NB or anchor NB, which may be the NB used for the PDCCH.

In some examples, FDRA size alignment may be needed for a DCI format (e.g., DCI format 1_0) used for a common search space (CSS) to reduce the PDCCH overhead and/or the number of blind decodings needed when the same search space is also used for transmitting broadcast PDCCH to a premium UE (e.g., a UE supporting a wide or full carrier bandwidth) in addition to a reduced-capability UE. For FDRA alignment, one or more zero padding bits may be added as the MSB (most-significant bits) of the FDRA field, and the bit size of a FDRA field may be increased to $$\lceil \log2(N_{RB}^{BWP}(N_{RB}^{BWP}+1)/2)\rceil$$

that is determined by the size of the wide BWP and has the same size of the FDRA field used for resource allocation for the premium UE. For a reduced-capability UE, the resource allocation for NB hopping may be given by the $$(\lceil \log2(N_{RB}^{NB}(N_{RB}^{NB}+1)/2)\rceil + X)$$

LSB (least-significant bits) bits of the FDRA field. For a DCI format (e.g., DCI format 1_1) used for a UE-specific search space (USS), the size of the FDRA field is $$\lceil \log2(N_{RB}^{NB}(N_{RB}^{NB}+1)/2)\rceil + X$$

bits, i.e. no zero padding bits added to the FDRA field.

In some aspects of the disclosure, NB hopping for PDSCH may be configured semi-statically by RRC with or without dynamic activation/deactivation by DCI. In one example, when DCI activation is used, a reduced-capability UE may reinterpret or repurpose a VRB-to-PRB mapping field in the DCI to be a frequency hopping (FH) flag because interleaved mapping of virtual resource blocks (VRBs) to physical resource blocks (PRBs) is not applied to a bandwidth limited UE (e.g., NR-Light UE or the like) that is configured with a wide BWP, for example, as described above in relation to FIG. 5.

In one aspect of the disclosure, a PDSCH NB hopping configuration may include a hopping time interval $t_{hop}$ and a hopping frequency offset $f_{hop}$ or a maximum number of hops $N_{hop}$. These parameters can be common to all the UEs sharing the same BWP for the benefits of inter-cell interference coordination. Based on the above described configuration, the NBs for frequency hopping PDSCH transmission may be determined by:

$$n_{NB}^{(i)} = \left(n_{NB}^{(i_0)} + \left(\left\lfloor \frac{i}{t_{hop}}\right\rfloor \mathrm{mod} N_{hop}\right)\cdot f_{hop}\right)\mathrm{mod} N_{NB}^{hop},$$

where $$n_{NB}^{(i_0)}$$

is the narrowband indicated by the DCI and i is the slot index and $$N_{NB}^{hop}$$

is the number of narrowbands in the BWP.

In some aspects of the disclosure, PDSCH frequency hopping between two NBs may have a time gap between successive hops, and the time gap may depend on UE capability and the NB locations in the BWP. In some cases, the time gap, if needed, may be BWP-specific. For example, the time gap may depend on radio frequency (RF) returning time of the UE and the supported maximum communication bandwidth of the UE.

Figure 7:
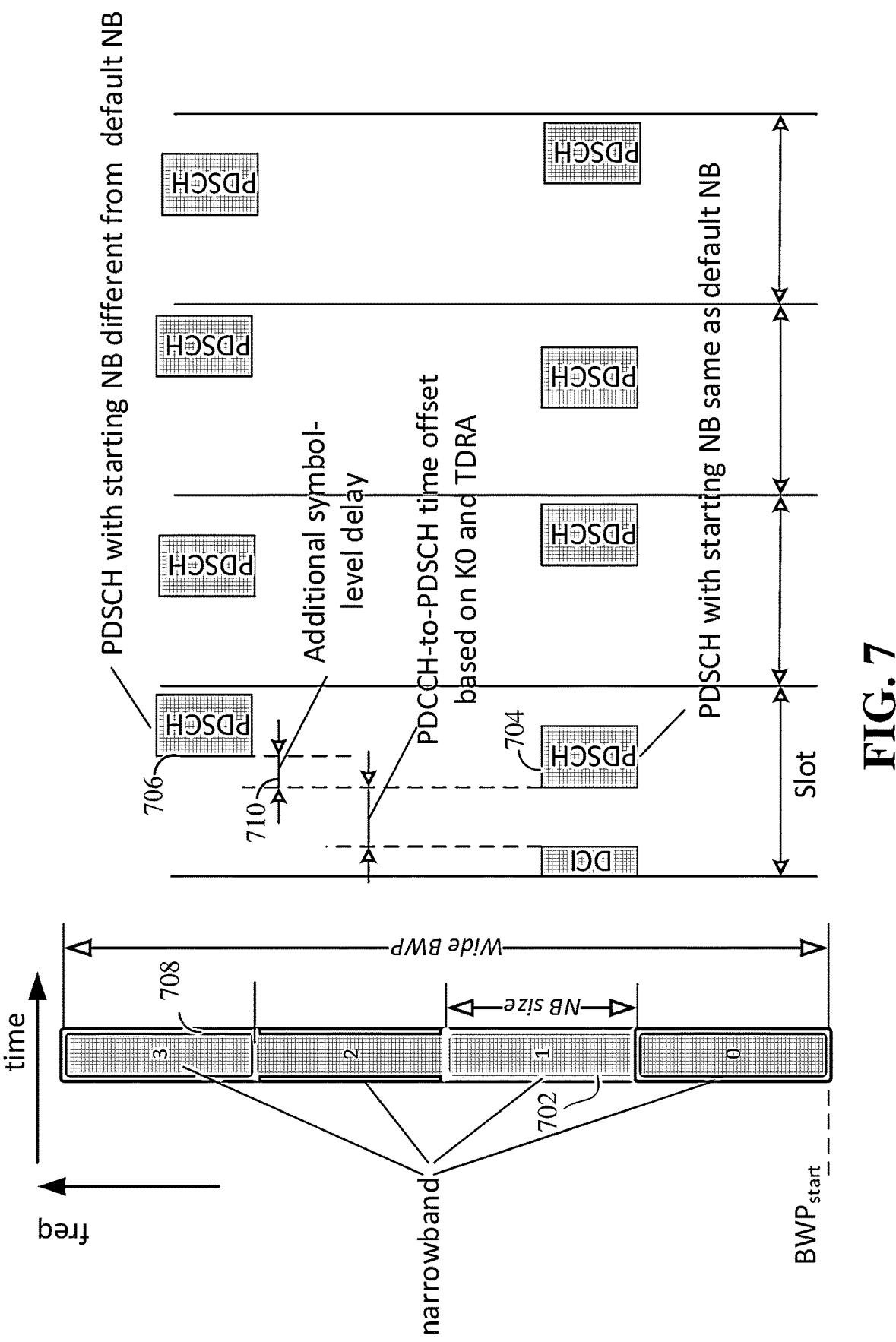
FIG. 7 is a diagram illustrating exemplary PDSCH transmissions using narrowband frequency hopping.

FIG. 7 is a diagram illustrating exemplary two PDSCH transmissions using NB frequency hopping. A first PDSCH transmission with NB hopping may start from an active or default NB 702 (NB #1 in FIG. 7). The UE may monitor the PDCCH/DCI in the active or default NB. In this case, the time domain scheduling parameter K0, which defines a slot-level PDSCH scheduling delay, is not changed due to NB hopping. For example, when K0 is 0, a PDSCH 704 starts in the same slot as the PDCCH (DCI) from a symbol based on the time domain resource allocation (TDRA) of the PDSCH. The TDRA may be implemented as a look-up table including a number of entries. The TDRA indicates the starting symbol and length of the PDSCH in the slot. When a second PDSCH transmission 706 is scheduled to start from a NB 708 (NB #3 in FIG. 7) other than the active or default NB 702, additional symbol-level delay may be introduced on top of K0. For example, the second PDSCH transmission 706 may be postponed by a few symbols based on the additional delay. In such a case, the configuration of the TDRA table does not necessarily consider NB hopping. There is no restriction on TDRA table, and full scheduling flexibility can be achieved for the non-hopping case. In one example, the additional delay value may be fixed based on the UE RF returning time. Alternatively, the delay value may be a value that ensures that the delayed PDSCH starts no earlier than the time the UE has completed reconfiguring its RF chain to use a different NB. For example, the delay value may be variable based on the difference between the indicated PDSCH-to-PDSCH time offset and the UE's RF returning time. As another example, the delay value may be a value that ensures that the delayed PDSCH still stays within the slot defined by the parameter K0.

In some aspects of the disclosure, the usage of the additional delay may also be dependent on the PDCCH-to-PDSCH time offset, which is determined by a PDSCH parameter K0, TDRA of PDSCH, and PDSCH mapping type. The PDSCH has two different types of mapping called type A and type B. These types are characterized by DMRS location and PDSCH starting symbol. For PDSCH mapping type A, the PDSCH starting symbol is limited to the first few symbols (e.g., symbols 0-3) of a slot. Therefore, it is not always possible to postpone PDSCH transmission by additional symbol delay. For PDSCH mapping type B, the PDSCH starting symbol is more flexible than type A. For example, the PDSCH starting symbol may be within symbols 0-12 in case of normal CP length or symbols 0-10 in case of extended CP length. For example, for PDSCH mapping type B, if the PDCCH-to-PDSCH time offset is smaller than a threshold, an additional symbol level delay may be used if needed. The threshold may be a value based on the UE's RF returning time or the like.

In some aspects of the disclosure, if additional symbol-level delay is not supported by the UE, the starting NB may be determined based on the PDCCH-to-PDSCH time offset.

For example, the active or default NB for PDCCH monitoring may be used as the starting NB irrespective the starting NB indicated in the DCI if PDCCH-to-PDSCH time offset is smaller than a threshold such that the PDCCH-to-PDSCH time offset may not provide sufficient delay for the UE to reconfigure (e.g., RF returning) its RF chain to use a different NB. However, if the PDCCH-to-PDSCH time offset is not smaller than the threshold, the UE may use the starting NB indicated by the PDCCH/DCI. In this case, the PDSCH-to-PDSCH time offset provides sufficient time for the UE to reconfigure its RF chain for the new NB.

Figure 8:
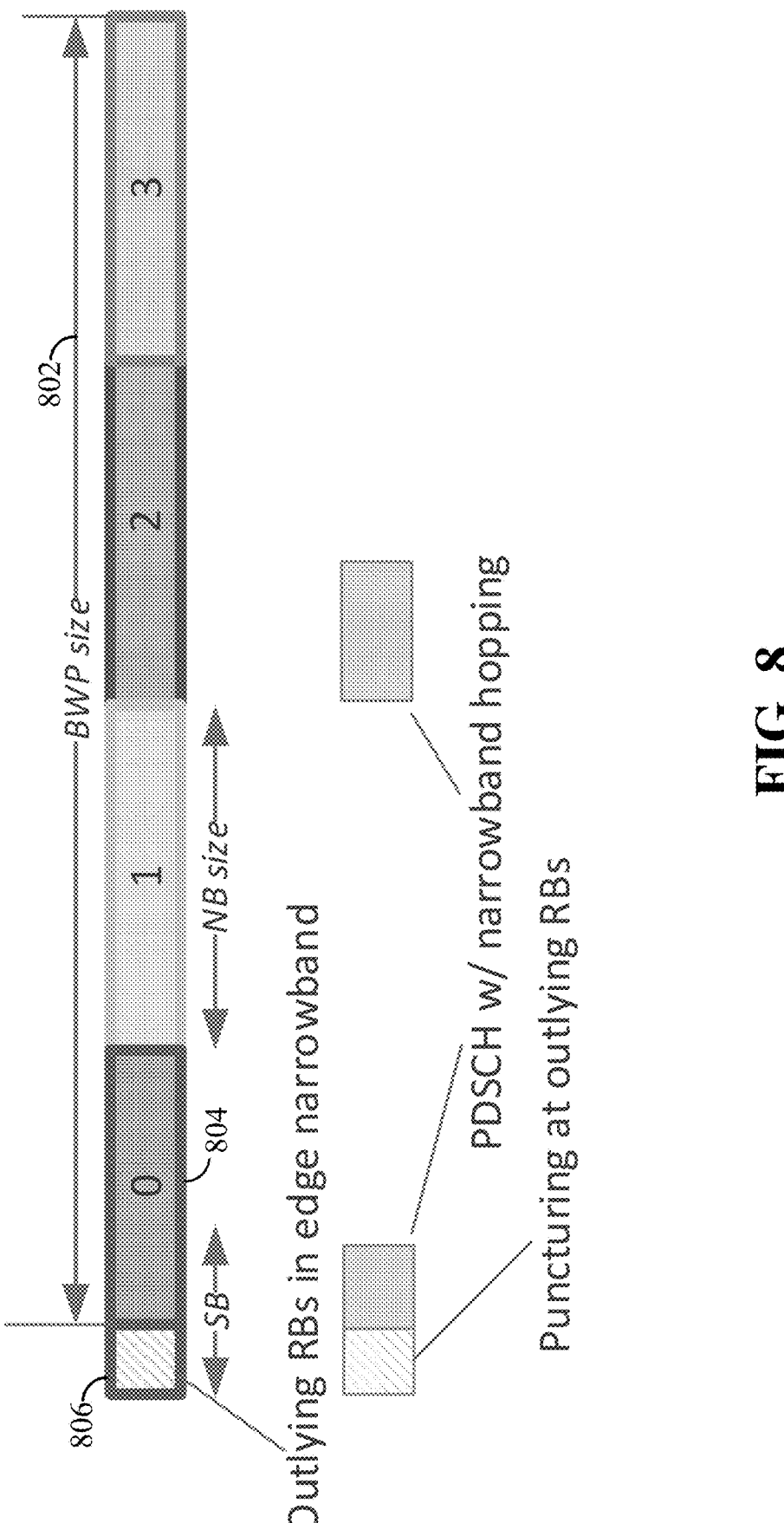
FIG. 8 is a diagram illustrating exemplary narrowband and subband alignment for a PDSCH transmission using frequency hopping.
Figure 14:
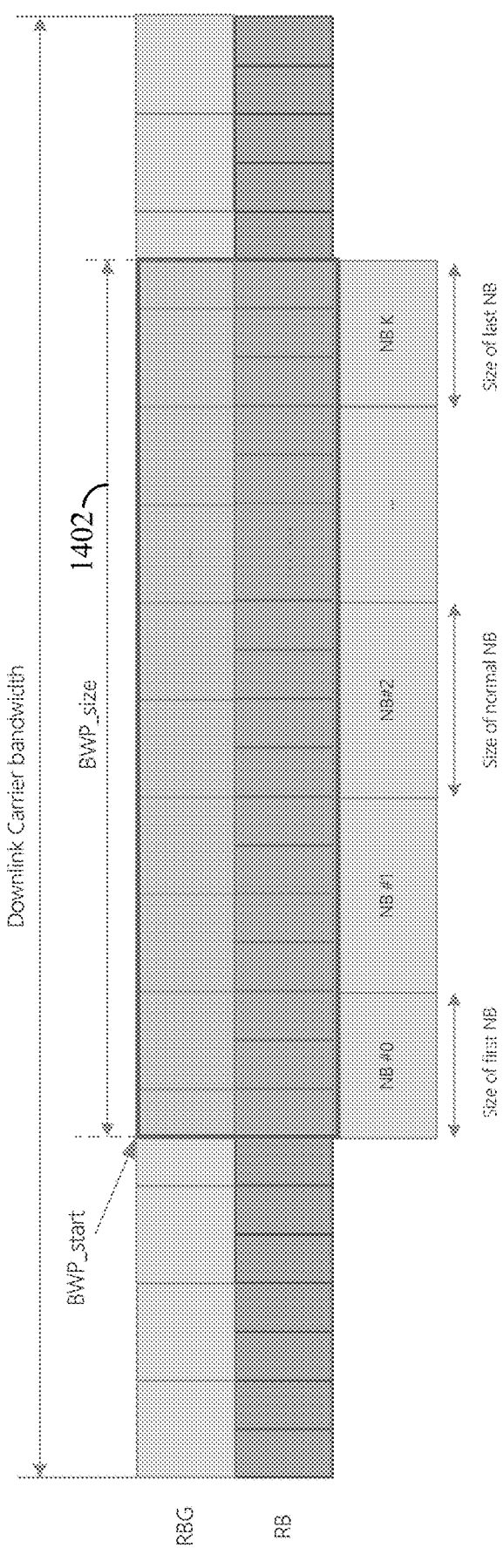
FIG. 14 is a diagram illustrating an example of NB and subband alignment.

FIG. 8 is a diagram illustrating exemplary narrowband (NB) and subband alignment for a PDSCH transmission using frequency hopping (FH). In one aspect of the disclosure, a BWP 802 includes four NBs (denoted as NBs 0, 1, 2, and 3 in FIG. 8). In some examples, the starting or ending of the BWP may not be aligned with subbands. As a result, the size of an edge NB 804 (e.g., NB 0) may be different from other NBs (e.g., NB 1, 2, and 3) in the same BWP 802. In another example, the total number of subbands in a BWP may not be an integer multiple of the total number of subbands in a narrowband. FIG. 14 is a diagram illustrating an example of NB and subband alignment. Referring to FIG. 14, the start of a wide BWP 1402 is not aligned with the RBG boundary. When partitioning the wide BWP 1402 into multiple NBs (e.g., NB #0, NB #1, NB #2 . . . NB k in FIG. 14), the size of the first NB (e.g., NB #0) and last NB (e.g., NB k) may be different from that of other NBs (e.g., NB #1 and NB #2). In some aspects of the disclosure, the partition of the BWP into NBs may be implemented by grouping adjacent RBGs into one narrowband.

As a result, the first or last NB in the BWP may have a different size as other NBs. Since the resource allocation within a NB is based on the maximum NB size, a PDSCH transmission in outlying RBs 806 of the edge NB (e.g., NB 0) can be punctured. The outlying RBs are the RBs not included in the BWP.

In some aspects of the disclosure, NB frequency hopping is used for a UE-specific PDSCH, but not broadcast PDSCH. For example, the UE-specific PDSCH may be scheduled by a PDCCH with a CRC scrambled by C-RNTI (Cell Radio Network Temporary Identifier), MCS-C-RNTI (Modulation Coding Scheme Cell RNTI), CS-RNTI (Configured Scheduling RNTI). A broadcast PDSCH does not use frequency hopping.

Figure 9:
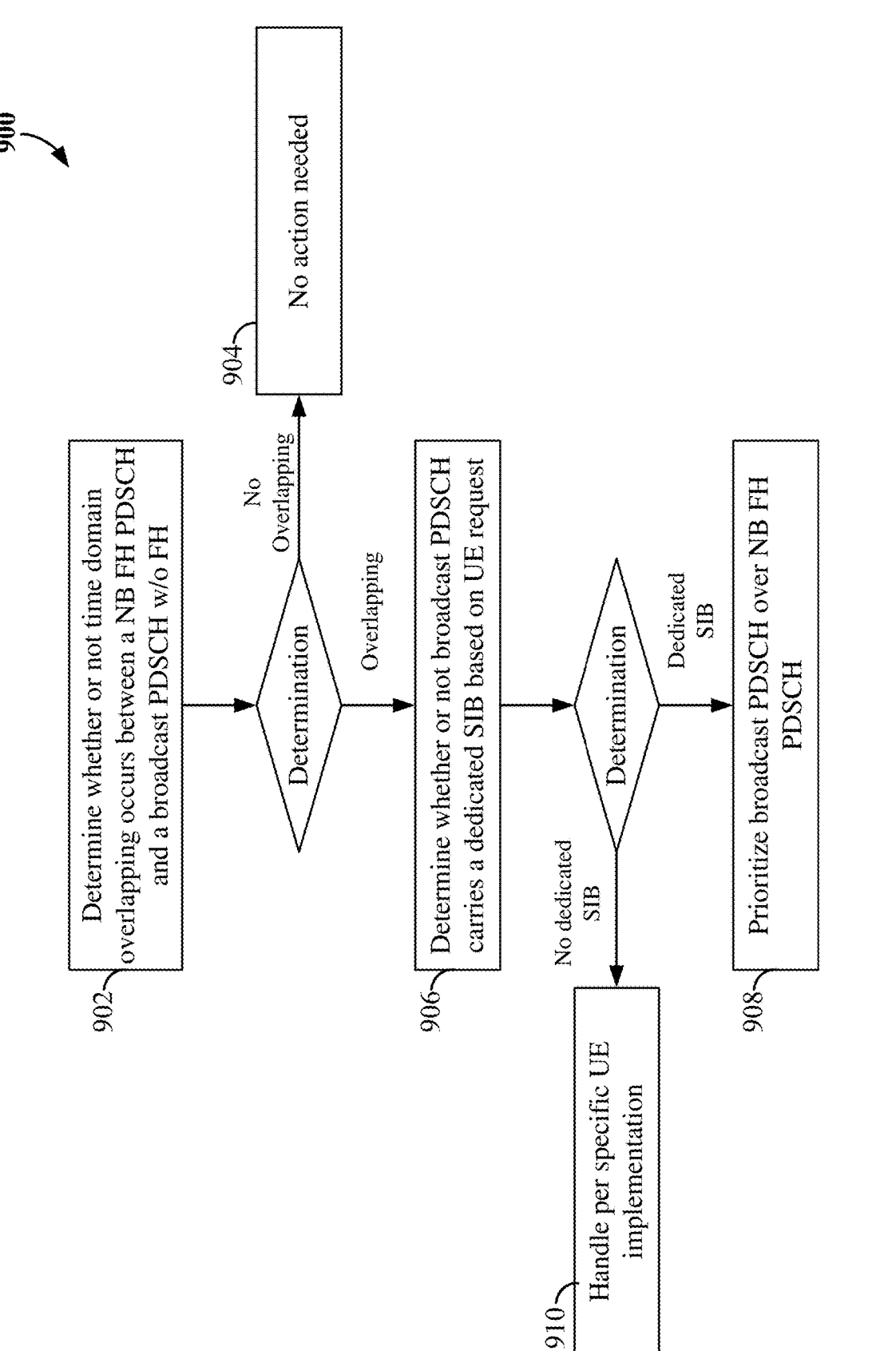
FIG. 9 is a flow chart illustrating an exemplary method for handling overlapping between a broadcast PDSCH and a narrowband PDSCH according to some aspects of the disclosure.

When there is an overlap in the time domain between a PDSCH using NB frequency hopping (FH) and a broadcast PDSCH without using NB hopping, certain priority rules may be used to handle the overlapping situation. FIG. 9 is a flow chart illustrating an exemplary method 900 for handling overlapping between a broadcast PDSCH and a NB FH PDSCH. In some examples, the method 900 may be operated at any of the UEs illustrated in FIGS. 1-3 and 6.

At block 902, a UE determines whether or not time domain overlapping occurs between a PDSCH using NB frequency hopping (FH) and a broadcast PDSCH without FH. At block 904, if the UE determines that there is no overlapping, the UE may take no action regarding the overlapping. At block 906, if there is an overlap between the broadcast PDSCH and the PDSCH using FH, the UE determines whether or not the broadcast PDSCH carries at least one of a dedicated system information block (SIB) requested by the UE or on-demand system information. At block 908, if the broadcast PDSCH carries the SIB requested by the UE, the UE may prioritize the broadcast PDSCH over the PDSCH using NB FH. At block 910, if the broadcast PDSCH does not carry the SIB requested by the UE, the UE may handle the overlapping situation using rules according to specific UE implementations.

Figure 10:
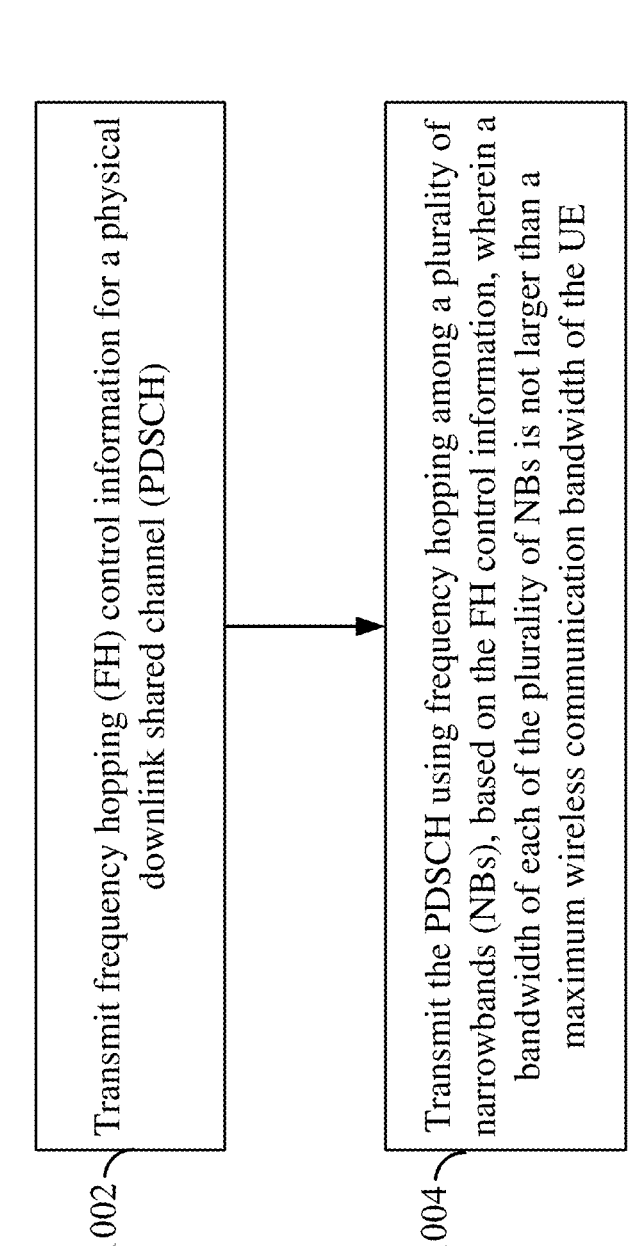
FIG. 10 is a flow chart illustrating an exemplary process for transmitting a PDSCH using frequency hopping according to some aspects of the disclosure.

FIG. 10 is a flow chart illustrating an exemplary process 1000 for transmitting a PDSCH using frequency hopping according to some aspects of the disclosure. As described below, some or all illustrated features may be omitted in a particular implementation within the scope of the present disclosure, and some illustrated features may not be required for the implementation of all embodiments. In some examples, the process 1000 may be carried out by the scheduling entity 1100 illustrated in FIG. 11. In some examples, the process 1000 may be carried out by any suitable apparatus or means for carrying out the functions or algorithms described below.

At block 1002, a scheduling entity (e.g., a base station or gNB) transmits frequency hopping (FH) control information for a PDSCH. The PDSCH may be similar to the frequency hopping PDSCHs described above in relation to FIGS. 4-8. At block 1004, the scheduling entity transmits the PDSCH using frequency hopping among a plurality of NBs, based on the FH control information. A bandwidth of each NB is not larger than a maximum wireless communication bandwidth supported by a UE that receives the PDSCH.

In some examples, the plurality of NBs may be included in a wide bandwidth part (e.g., a wide BWP illustrated in 7), and the BWP has a bandwidth larger than the maximum wireless communication bandwidth of the UE. In some examples, the FH control information may include frequency domain resource allocation (FDRA) information that includes a NB index and resource assignment for the PDSCH. The NB index indicates a starting narrowband selected for the PDSCH using frequency hopping among the plurality of NBs, and the resource assignment allocates frequency resources within the selected narrowband.

In some examples, the FH control information may include a FDRA field that has a first plurality of bits based on a size of a BWP that has a bandwidth larger than the maximum wireless communication bandwidth of the UE. The least significant bits of the first plurality of bits may be configured to indicate the starting NB and the resource assignment within the selected narrowband.

In some examples, the scheduling entity may transmit the PDSCH using frequency hopping between a first narrowband and a second narrowband among the plurality of NBs. The first narrowband and the second narrowband may not be adjacent to each other in the frequency domain. Two narrowbands are not adjacent when one or more RBs are present between the narrowbands in the frequency domain. In some examples, the FH control information may include a hopping time interval, a hopping frequency offset, and a maximum number of hops. In some examples, the scheduling entity may select a narrowband based on the hopping time interval, the hopping frequency offset, and the maximum number of hops.

In some examples, the scheduling entity may transmit downlink control information (DCI) in a first narrowband for controlling the PDSCH. Then, the scheduling entity may transmit the PDSCH starting in a second narrowband configured based on the DCI. A PDSCH scheduling delay may depend on at least one of an RF returning capability of the UE.

In some examples, the scheduling entity may transmit the PDSCH using frequency hopping between a first narrowband and a second narrowband. One or more resource blocks of the first narrowband that is not aligned with a subband, may be punctured with respect to the PDSCH, and the punctured resource blocks are located outside of a bandwidth part including narrowbands (e.g., see outlying RBs it FIG. 8).

Figure 11:
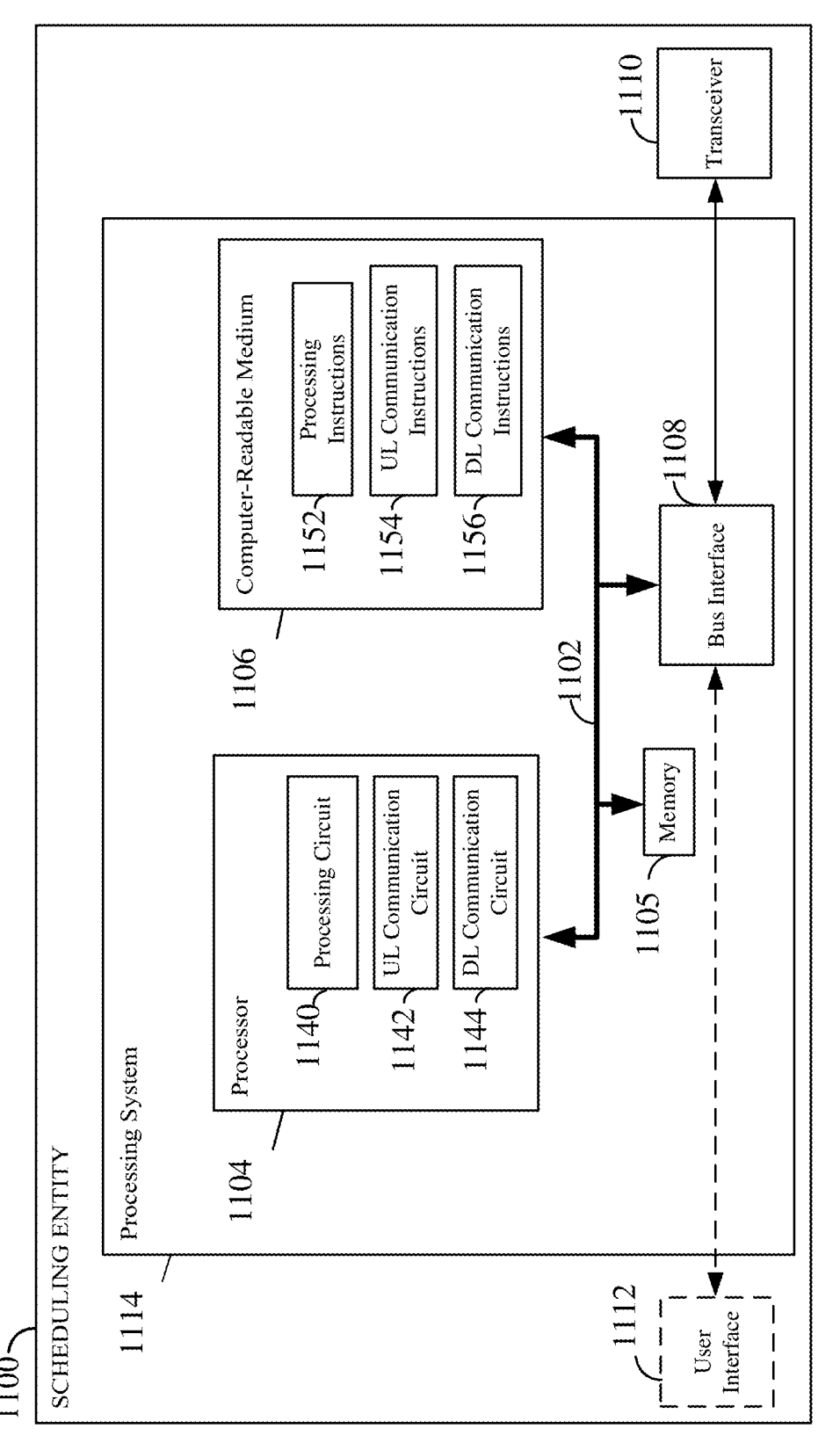
FIG. 11 is a block diagram conceptually illustrating an example of a hardware implementation for a scheduling entity according to some aspects of the disclosure.

FIG. 11 is a block diagram illustrating an example of a hardware implementation for a scheduling entity 1100 employing a processing system 1114. For example, the scheduling entity 1100 may be a base station as illustrated in any one or more of FIGS. 1, 2, 3, and/or 6.

The scheduling entity 1100 may be implemented with a processing system 1114 that includes one or more processors 1104. Examples of processors 1104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 1100 may be configured to perform any one or more of the functions described herein. That is, the processor 1104, as utilized in a scheduling entity 1100, may be used to implement any one or more of the processes and procedures described and illustrated in relation to FIGS. 4-10.

In this example, the processing system 1114 may be implemented with a bus architecture, represented generally by the bus 1102. The bus 1102 may include any number of interconnecting buses and bridges depending on the specific application of the processing system 1114 and the overall design constraints. The bus 1102 communicatively couples together various circuits including one or more processors (represented generally by the processor 1104), a memory 1105, and computer-readable media (represented generally by the computer-readable medium 1106). The bus 1102 may also link various other circuits such as timing sources, peripherals, voltage regulators, and power management circuits, which are well known in the art, and therefore, will not be described any further. The bus 1102 may be implemented as a serial bus or parallel bus. A bus interface 1108 provides an interface between the bus 1102 and a transceiver 1110. The transceiver 1110 provides a communication interface or means for communicating with various other apparatus over a transmission medium. Depending upon the nature of the apparatus, a user interface 1112 (e.g., keypad, display, speaker, microphone, joystick, touchscreen) may also be provided. Of course, such a user interface 1112 is optional, and may be omitted in some examples, such as a base station.

In some aspects of the disclosure, the processor 1104 may include circuitry configured for various functions, including, for example, downlink communication (e.g., PDSCH) using frequency hopping. For example, the circuitry may be configured to implement one or more of the functions described in relation to FIGS. 4-10.

For example, the processor 1104 may include a processing circuit 1140, an uplink (UL) communication circuit 1142, and a downlink (DL) communication circuit 1144. The processing circuit 1140 may be configured to perform various data processing, communication, and logic functions in cooperation with or without one or more other components of the scheduling entity 1100. In one example, the scheduling entity 1100 may use the processing circuit 1140 to schedule and allocate communication resources for UL and DL communications, for example, a PDSCH using frequency hopping as described in relation to FIGS. 4-10. The scheduling entity 1100 may use the UL communication circuit 1142 to perform various UL communication functions with one or more other devices (e.g., a UE). The scheduling entity may use the DL communication circuit 1144 to perform various DL communication functions with one or more other devices (e.g., UE). In one example, the scheduling entity may use the DL communication circuit 1144 to transmit, via the transceiver 1110, frequency hopping control information for a PDSCH. In one example, the scheduling entity may use the DL communication circuit 1144 to transmit the PDSCH using frequency hopping among a plurality of narrowbands (NBs), based on the frequency hopping control information. A bandwidth of each of the plurality of NBs is not larger than a maximum wireless communication bandwidth of the UE.

The processor 1104 is responsible for managing the bus 1102 and general processing, including the execution of software stored on the computer-readable medium 1106. The software, when executed by the processor 1104, causes the processing system 1114 to perform the various functions described below for any particular apparatus. The computer-readable medium 1106 and the memory 1105 may also be used for storing data that is manipulated by the processor 1104 when executing software.

One or more processors 1104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1106. The computer-readable medium 1106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1106 may reside in the processing system 1114, external to the processing system 1114, or distributed across multiple entities including the processing system 1114. The computer-readable medium 1106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 1106 may include software configured for various functions, including, for example, downlink communication (e.g., PDSCH) using frequency hopping. For example, the software may be configured to implement one or more of the functions described above in relation to FIGS. 4-10.

For example, the software may include processing instructions 1152, UL communication instructions 1154, and DL communication instructions 1156. The processing instructions when executed by the processor 1104 may perform various data processing, communication, and logic functions in cooperation with or without one or more other components of the scheduling entity 1100. The UL communication instructions 1154 when executed by the processor 1104 may perform various UL communication functions with one or more other devices (e.g., a UE). The DL communication instructions 1156 when executed by the processor 1104 may perform various DL communication functions with one or more other devices (e.g., UE), for example, PDSCH transmission using frequency hopping.

In one configuration, the scheduling entity 1100 for wireless communication includes means for transmitting frequency hopping control information for a PDSCH to a UE; and means for transmitting the PDSCH using frequency hopping among a plurality of NBs, based on the frequency hopping control information. A bandwidth of each of the plurality of NBs is not larger than a maximum wireless communication bandwidth of the UE. In one aspect, the aforementioned means may be the processor(s) 1104 shown in FIG. 11 configured to perform the functions recited by the aforementioned means. In another aspect, the aforementioned means may be a circuit or any apparatus configured to perform the functions recited by the aforementioned means.

Of course, in the above examples, the circuitry included in the processor 1104 is merely provided as an example, and other means for carrying out the described functions may be included within various aspects of the present disclosure, including but not limited to the instructions stored in the computer-readable storage medium 1106, or any other suitable apparatus or means described in any one of the FIGS. 1, 2, 3, and/or 6, and utilizing, for example, the processes and/or algorithms described herein in relation to FIGS. 4-10.

Figure 12:
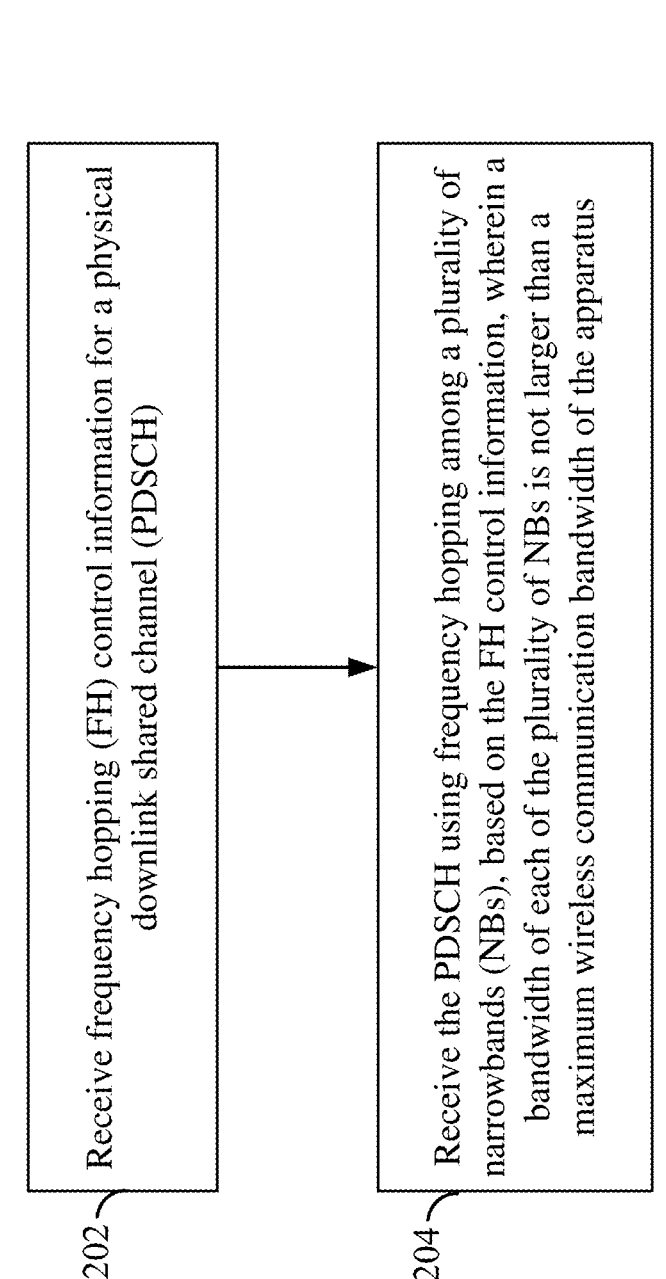
FIG. 12 is a flow chart illustrating an exemplary process for receiving a PDSCH using frequency hopping in accordance with some aspects of the disclosure.

FIG. 12 is a flow illustrating an exemplary process 1200 for receiving a PDSCH using frequency hopping in accordance with some aspects of the present disclosure. As described below, some or all illustrated features may be omitted in a particular implementation within the scope of the present disclosure, and some illustrated features may not be required for the implementation of all embodiments. In some examples, the process 1200 may be carried out by the scheduled entity 1300 illustrated in FIG. 13. In some examples, the process 1200 may be carried out by any suitable apparatus (e.g., UE) or means for carrying out the functions or algorithms described below.

At block 1202, a scheduled entity (e.g., UE) receives frequency hopping (FH) control information for a PDSCH. The PDSCH may be similar to the frequency hopping PDSCHs described above in relation to FIGS. 4-8. At block 1204, the scheduled entity receives the PDSCH using frequency hopping among a plurality of NBs, based on the FH control information. A bandwidth of each of the plurality of NBs is not larger than a maximum wireless communication bandwidth of the scheduled entity.

In some examples, the plurality of NBs may be included in a wide bandwidth part (e.g., a wide BWP illustrated in 7), and the wide BWP has a bandwidth larger than the maximum wireless communication bandwidth of the scheduled entity. In some examples, the FH control information may include frequency domain resource allocation (FDRA) information that includes a NB index and resource assignment. The NB index indicates a starting narrowband selected for the PDSCH using frequency hopping among the plurality of NBs, and the resource assignment allocates resources within the selected narrowband for the PDSCH.

In some examples, the FH control information may include a FDRA field that has a first plurality of bits based on a size of a wide BWP that has a bandwidth larger than the maximum wireless communication bandwidth of the scheduled entity. The least significant bits of the first plurality of bits may be configured to indicate the resource assignment within the selected narrowband for the PDSCH.

In some examples, the scheduled entity may receive the PDSCH using frequency hopping between a first narrowband and a second narrowband. The first narrowband and the second narrowband may not be adjacent to each other in a frequency domain. In some examples, the FH control information may include a hopping time interval, a hopping frequency offset, and a maximum number of hops. In some examples, the scheduled entity may select a narrowband among a plurality of NBs, based on the hopping time interval, the hopping frequency offset, and the maximum number of hops.

In some examples, the scheduled entity may receive downlink control information (DCI) in a first narrowband for controlling the PDSCH. Then, the scheduled entity may receive the PDSCH starting in a second narrowband. A delay between the DCI and the PDSCH may depend on at least one of an RF returning capability of the scheduled entity or a slot-level PDSCH scheduling delay.

In some examples, the scheduled entity may receive the PDSCH using frequency hopping between a first narrowband and a second narrowband. One or more resource blocks of the first narrowband that is not aligned with a subband are punctured with respect to the PDSCH, and the punctured resource blocks are located outside of a bandwidth part including the plurality of NBs (e.g., see outlying RBs in FIG. 8).

In some examples, the scheduled entity may prioritize reception of a broadcast PDSCH over a UE-specific PDSCH with frequency hopping, when the broadcast PDSCH is partially overlapping with the UE-specific PDSCH. For example, if the broadcast PDSCH carries a SIB requested by the scheduled entity, the scheduled entity may prioritize the broadcast PDSCH over the UE-specific PDSCH.

Figure 13:
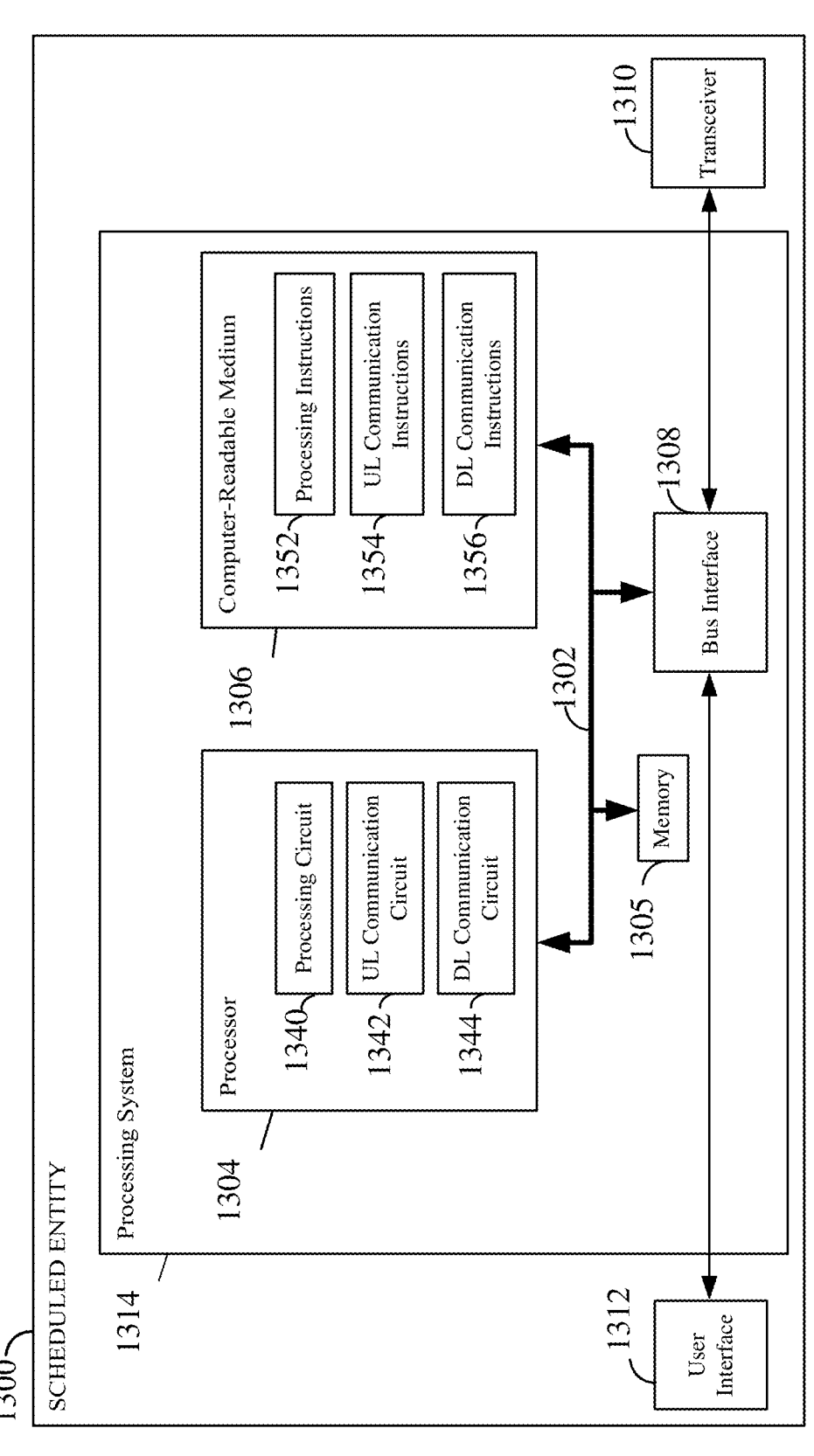
FIG. 13 is a block diagram conceptually illustrating an example of a hardware implementation for a scheduled entity according to some aspects of the disclosure.

FIG. 13 is a conceptual diagram illustrating an example of a hardware implementation for an exemplary scheduled entity 1300 employing a processing system 1314. In accordance with various aspects of the disclosure, an element, or any portion of an element, or any combination of elements may be implemented with a processing system 1314 that includes one or more processors 1304. For example, the scheduled entity 1300 may be a user equipment (UE) as illustrated in any one or more of FIGS. 1, 2, 3, and/or 6.

The processing system 1314 may be substantially the same as the processing system 1114 illustrated in FIG. 11, including a bus interface 1308, a bus 1302, memory 1305, a processor 1304, and a computer-readable medium 1306. Furthermore, the scheduled entity 1300 may include a user interface 1312 and a transceiver 1310 substantially similar to those described above in FIG. 11. That is, the processor 1304, as utilized in a scheduled entity 1300, may be used to implement any one or more of the processes described and illustrated in FIGS. 4-9 and 12.

In some aspects of the disclosure, the processor 1304 may include circuitry configured for various functions, including, for example, downlink communication (e.g., PDSCH) using frequency hopping. For example, the circuitry may be configured to implement one or more of the functions described below in relation to FIGS. 4-9 and 12.

For example, the processor 1304 may include a processing circuit 1340, an uplink (UL) communication circuit 1342, and a downlink (DL) communication circuit 1344. The processing circuit 1340 may be configured to perform various data processing, communication, and logic functions in cooperation with or without one or more other components of the scheduled entity 1300. In one example, the scheduled entity 1300 may use the processing circuit 1340 to schedule and allocate communication resources for UL and DL communications, for example, a PDSCH using frequency hopping as described in relation to FIGS. 4-9 and 12. The UL communication circuit 1342 may be configured to perform various UL communication functions with one or more other devices (e.g., a scheduling entity). The DL communication circuit 1344 may be configured to perform various DL communication functions with one or more other devices (e.g., a scheduling entity). In one example, the scheduled entity may use the DL communication circuit 1344 to receive, via the transceiver 1310, frequency hopping (FH) control information for a PDSCH. In one example, the scheduled entity may use the DL communication circuit 1344 to receive the PDSCH using frequency hopping among a plurality of NBs, based on the frequency hopping control information. A bandwidth of each of the plurality of NBs is not larger than a maximum wireless communication bandwidth of the scheduled entity.

In one configuration, the scheduled entity 1300 for wireless communication includes means for receiving frequency hopping control information for a PDSCH; and means for receiving the PDSCH using frequency hopping among a plurality of NBs, based on the frequency hopping control information. A bandwidth of each of the plurality of NBs is not larger than a maximum wireless communication bandwidth of the scheduled entity. In one aspect, the aforementioned means may be the processor(s) 1304 shown in FIG. 13 configured to perform the functions recited by the aforementioned means. In another aspect, the aforementioned means may be a circuit or any apparatus configured to perform the functions recited by the aforementioned means.

Of course, in the above examples, the circuitry included in the processor 1304 is merely provided as an example, and other means for carrying out the described functions may be included within various aspects of the present disclosure, including but not limited to the instructions stored in the computer-readable storage medium 1306, or any other suitable apparatus or means described in any one of the FIGS. 1, 2, 3, and/or 6, and utilizing, for example, the processes and/or algorithms described herein in relation to FIGS. 4-9 and 12.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-14 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-14 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. An apparatus for wireless communication, comprising:
one or more processors;
a transceiver communicatively coupled to the processor; and
a memory communicatively coupled to the one or more processors,
wherein the one or more processors are configured to:
receive, via the transceiver in a first narrowband of a plurality of narrowbands (NBs), frequency hopping (FH) control information for a physical downlink shared channel (PDSCH), wherein a PDSCH scheduling delay of the PDSCH is based on whether or not the PDSCH starts in the first narrowband; and
receive, via the transceiver, the PDSCH using frequency hopping starting in a second narrowband among the plurality of NBs, based on the FH control information,
wherein the FH control information comprises frequency domain resource allocation (FDRA) information that includes:
an index configured to indicate the second narrowband selected for starting the reception of the PDSCH using frequency hopping among the plurality of NBs; and
resource assignment of resource blocks allocated to the PDSCH within the selected second narrowband,
wherein the FH control information further comprises a hopping time interval and a hopping frequency offset, and
wherein a bandwidth of each of the plurality of NBs is not larger than a maximum wireless communication bandwidth of the apparatus.

2. The apparatus of claim 1, wherein the plurality of NBs are included in a bandwidth part that has a bandwidth larger than the maximum wireless communication bandwidth of the apparatus.

3. The apparatus of claim 2, wherein the one or more processors are further configured to determine a configuration of the plurality of NBs based on at least one of a radio resource control (RRC) configuration or a predetermined rule; and
wherein the RRC configuration or the predetermined rule indicates a plurality of contiguous resource blocks, allocated to each of the plurality of NBs, wherein the size of the plurality of contiguous resource blocks is configurable based at least on a bandwidth of the bandwidth part.

4. The apparatus of claim 1, wherein the FH control information comprises the hopping time interval, the hopping frequency offset, and a maximum number of hops.

5. An apparatus for wireless communication, comprising:
one or more processors; and
a memory communicatively coupled to the one or more processors,
wherein the one or more processors are configured to:
transmit, in a first narrowband of a plurality of narrowbands (NBs), to a user equipment (UE) frequency hopping (FH) control information for a physical downlink shared channel (PDSCH), wherein a PDSCH scheduling delay of the PDSCH is based on whether or not the PDSCH starts in the first narrowband; and
transmit to the UE the PDSCH using frequency hopping starting in a second narrowband among the plurality of NBs, based on the FH control information,
wherein the FH control information comprises frequency domain resource allocation (FDRA) information that includes:

an index configured to indicate the second narrowband
selected for starting the reception of the PDSCH
using frequency hopping among the plurality of
NBs; and resource assignment of frequency resources allocated
to the PDSCH within the selected second narrow-
band, wherein the FH control information further comprises a
hopping time interval and a hopping frequency offset,
and wherein a bandwidth of each of the plurality of NBs is not
larger than a maximum wireless communication band-
width of the UE.

6. The apparatus of claim 5, wherein the plurality of NBs
are included in a bandwidth part that has a bandwidth larger
than the maximum wireless communication bandwidth of
the UE.

7. The apparatus of claim 5, wherein the one or more
processors are further configured to:

transmit downlink control information (DCI) mapped to a
common search space, wherein the FH control information comprises a FDRA
field included in the DCI, wherein the FDRA field comprises a first plurality of bits
based on a size of a bandwidth part that has a band-
width larger than the maximum wireless communica-
tion bandwidth of the UE, and wherein least significant bits of the first plurality of bits
are configured to indicate the second narrowband
selected for starting the reception of the PDSCH and
the resource assignment within the selected second
narrowband.

8. The apparatus of claim 5, wherein the FH control
information comprises the hopping time interval, the hop-
ping frequency offset, and a maximum number of hops.

9. A method for wireless communication at a user equip-
ment (UE), comprising:

receiving, in a first narrowband of a plurality of narrow-
bands (NBs), frequency hopping (FH) control informa-
tion for a physical downlink shared channel (PDSCH),
wherein a PDSCH scheduling delay of the PDSCH is
based on whether or not the PDSCH starts in the first
narrowband; and receiving the PDSCH using frequency hopping starting in
a second narrowband among a plurality of NBs, based
on the FH control information, wherein the FH control information comprises frequency
domain resource allocation (FDRA) information that
includes:

an index configured to indicate the second narrowband
selected for starting the reception of the PDSCH
using frequency hopping among the plurality of
NBs; and resource assignment of resource blocks allocated to the
PDSCH within the selected second narrowband, wherein the FH control information further comprises a
hopping time interval and a hopping frequency offset,
and wherein a bandwidth of each of the plurality of NBs is not
larger than a maximum wireless communication band-
width of the UE.

10. The method of claim 9, wherein the plurality of NBs
are included in a bandwidth part that has a bandwidth larger
than the maximum wireless communication bandwidth of
the UE.

11. The method of claim 10, further comprising:

determining a configuration of the plurality of NBs based
on at least one of a radio resource control (RRC)
configuration or a predetermined rule.

12. The method of claim 11, wherein the RRC configu-
ration or the predetermined rule defines a plurality of
continuous subbands allocated to each of the plurality of
NBs and a bandwidth of the bandwidth part.

13. The method of claim 11, wherein the RRC configu-
ration or the predetermined rule defines a plurality of
continuous resource block groups allocated to each of the
plurality of NBs and a bandwidth of the bandwidth part.

14. The method of claim 9, wherein the FH control
information comprises a FDRA field including a plurality of
bits based on a size of the narrowband and a number of the
plurality of NBs in a bandwidth part.

15. The method of claim 9, further comprising:

receiving downlink control information (DCI) mapped to
a common search space, wherein the FH control information comprises a FDRA
field included in the DCI, wherein the FDRA field comprises a first plurality of bits
based on a size of a bandwidth part that has a band-
width larger than the maximum wireless communica-
tion bandwidth of the UE, and wherein least significant bits of the first plurality of bits
are configured to indicate the second narrowband
selected for starting the reception of the PDSCH and
the resource assignment of resource blocks allocated to
the PDSCH within the selected second narrowband.

16. The method of claim 9, further comprising:

receiving the PDSCH using frequency hopping between
the first narrowband of the plurality of NBs in a first
slot and the second narrowband among the plurality of
NBs in a second slot.

17. The method of claim 9, further comprising:

selecting a narrowband among the plurality of NBs, based
on the hopping time interval, the hopping frequency
offset, and the maximum number of hops.

18. The method of claim 9, further comprising:

receiving downlink control information (DCI) in the first
narrowband of the plurality of NBs, the DCI configured
to indicate a PDSCH scheduling delay and the second
narrowband of the plurality of NBs for starting the
reception of the PDSCH; and receiving the PDSCH starting in the second narrowband
of the plurality of NBs, wherein a starting time of the
PDSCH depends on at least one of a radio frequency
(RF) returning time of the UE or the PDSCH sched-
uling delay indicated in the DCI, wherein the PDSCH scheduling delay indicated in the
DCI is smaller than the RF returning time, the starting
of the PDSCH in the second narrowband is postponed
by an additional delay.

19. The method of claim 9, further comprising:

receiving downlink control information (DCI) in the first
narrowband of the plurality of NBs, the DCI configured
to indicate a PDSCH scheduling delay and a narrow-
band index for starting the reception of the PDSCH, receiving the PDSCH starting in the first narrowband
according to the PDSCH scheduling delay and over-
riding the narrowband index, when the PDSCH sched-
uling delay is smaller than a radio frequency returning
time of the UE.

20. The method of claim 9, further comprising:

receiving the PDSCH using frequency hopping between
the first narrowband that is an edge narrowband and the
second narrowband among the plurality of NBs, wherein one or more resource blocks of the first narrowband that are not aligned with a subband are punctured with respect to the PDSCH, the punctured resource blocks located outside of a bandwidth part including the plurality of NBs.

21. The method of claim 9, further comprising:

prioritizing reception of a broadcast PDSCH without frequency hopping over the PDSCH using frequency hopping that has at least one symbol overlapping with the reception of the broadcast PDSCH without frequency hopping, wherein the broadcast PDSCH comprises an on-demand system information.

22. The method of claim 9, wherein the FH control information comprises the hopping time interval, the hopping frequency offset, and a maximum number of hops.

23. A method for wireless communication at a scheduling entity, comprising:

transmitting, in a first narrowband of a plurality of narrowbands (NBs), to a user equipment (UE), frequency hopping (FH) control information for a physical downlink shared channel (PDSCH), wherein a PDSCH scheduling delay of the PDSCH is based on whether or not the PDSCH starts in the first narrowband; and transmitting, to the UE, the PDSCH using frequency hopping starting in a second narrowband among the plurality of NBs, based on the FH control information, wherein the FH control information comprises frequency domain resource allocation (FDRA) information that includes:

an index configured to indicate the second narrowband selected for starting the reception of the PDSCH using frequency hopping among the plurality of NBs; and resource assignment of resource blocks allocated to the PDSCH within the selected second narrowband, wherein the FH control information further comprises a hopping time interval and a hopping frequency offset, and wherein a bandwidth of each of the plurality of NBs is not larger than a maximum wireless communication bandwidth of the UE.

24. The method of claim 23, wherein the plurality of NBs are included in a bandwidth part that has a bandwidth larger than the maximum wireless communication bandwidth of the UE.

25. The method of claim 23, further comprising:

transmitting downlink control information (DCI) mapped to a common search space, wherein the FH control information comprises a FDRA field included in the DCI, wherein the FDRA field comprises a first plurality of bits based on a size of a bandwidth part that has a bandwidth larger than the maximum wireless communication bandwidth of the UE, and wherein least significant bits of the first plurality of bits are configured to indicate the second narrowband selected for starting the reception of the PDSCH and the resource assignment of resource blocks allocated to the PDSCH within the selected second narrowband.

26. The method of claim 23, further comprising:

transmitting the PDSCH using frequency hopping between the first narrowband and the second narrowband among the plurality of NBs, the first narrowband and the second narrowband not adjacent to each other in a frequency domain.

27. The method of claim 23, further comprising:

selecting the second narrowband among the plurality of NBs, based on the hopping time interval, the hopping frequency offset, and the maximum number of hops.

28. The method of claim 23, further comprising:

transmitting downlink control information (DCI) in the first narrowband of the plurality of NBs, the DCI configured to control the PDSCH; and transmitting the PDSCH starting in the second narrowband of the plurality of NBs, wherein a starting time of the PDSCH depends on at least one of a radio frequency (RF) returning time of the UE or a PDSCH scheduling delay indicated in the DCI, wherein the PDSCH scheduling delay indicated in the DCI is smaller than the RF returning time, the starting of the PDSCH in the second narrowband is postponed by an additional delay of a plurality of symbols.

29. The method of claim 23, further comprising:

transmitting downlink control information (DCI) in the first narrowband of the plurality of NBs, the DCI configured to indicate a PDSCH scheduling delay and a narrowband index for starting the reception of the PDSCH, transmitting the PDSCH starting in the first narrowband according to the PDSCH scheduling delay and overriding the narrowband index, when the PDSCH scheduling delay is smaller than a radio frequency returning time of the UE.

30. The method of claim 23, further comprising:

transmitting the PDSCH using frequency hopping between the first narrowband that is an edge narrowband and the second narrowband among the plurality of NBs, wherein one or more resource blocks of the first narrowband that are not aligned with a subband are punctured with respect to the PDSCH, the punctured resource blocks located outside of a bandwidth part including the plurality of NBs.

* * * * *